(12) United States Patent
Suto et al.

(10) Patent No.: US 10,392,682 B2
(45) Date of Patent: Aug. 27, 2019

(54) STEEL SHEET FOR THREE-PIECE CAN AND METHOD FOR MANUFACTURING THE SAME

(71) Applicant: JFE STEEL CORPORATION, Chiyoda-ku, Tokyo (JP)

(72) Inventors: Mikito Suto, Chiba (JP); Katsumi Kojima, Fukuyama (JP); Masaki Tada, Fukuyama (JP); Hiroki Nakamaru, Fukuyama (JP)

(73) Assignee: JFE Steel Corporation, Tokyo (JP)

( * ) Notice: Subject to any disclaimer, the term of this patent is extended or adjusted under 35 U.S.C. 154(b) by 429 days.

(21) Appl. No.: 14/440,779

(22) PCT Filed: Nov. 6, 2013

(86) PCT No.: PCT/JP2013/006553
§ 371 (c)(1),
(2) Date: May 5, 2015

(87) PCT Pub. No.: WO2014/073205
PCT Pub. Date: May 15, 2014

(65) Prior Publication Data
US 2015/0299828 A1 Oct. 22, 2015

(30) Foreign Application Priority Data

Nov. 7, 2012 (JP) ................................. 2012-245458

(51) Int. Cl.

| | |
|---|---|
| *C22C 38/06* | (2006.01) |
| *C21D 9/46* | (2006.01) |
| *C22C 38/00* | (2006.01) |
| *C21D 8/04* | (2006.01) |
| *C22C 38/02* | (2006.01) |
| *C22C 38/04* | (2006.01) |
| *C21D 6/00* | (2006.01) |
| *C21D 8/02* | (2006.01) |

(52) U.S. Cl.
CPC ............. *C22C 38/06* (2013.01); *C21D 6/005* (2013.01); *C21D 6/008* (2013.01); *C21D 8/0226* (2013.01); *C21D 8/0263* (2013.01); *C21D 8/0278* (2013.01); *C21D 8/0473* (2013.01); *C21D 9/46* (2013.01); *C22C 38/00* (2013.01); *C22C 38/001* (2013.01); *C22C 38/002* (2013.01); *C22C 38/004* (2013.01); *C22C 38/02* (2013.01); *C22C 38/04* (2013.01); *Y02P 10/212* (2015.11)

(58) Field of Classification Search
CPC ....... C22C 38/001; C22C 38/02; C22C 38/04; C22C 38/06
See application file for complete search history.

(56) References Cited

U.S. PATENT DOCUMENTS

| | | | | |
|---|---|---|---|---|
| 5,587,027 | A | * 12/1996 | Tosaka | ................. C21D 8/0473 148/320 |
| 2005/0067053 | A1* | 3/2005 | Friedrich et al. | ............. 148/111 |
| 2014/0034195 | A1 | 2/2014 | Suto | |

FOREIGN PATENT DOCUMENTS

| | | | | |
|---|---|---|---|---|
| CA | 2 833 452 | | 10/2012 | |
| CN | 1118814 | | 3/1996 | |
| CN | 1599804 | | 3/2005 | |
| CN | 102482748 | | 5/2012 | |
| EP | 0565066 | | 10/1993 | |
| EP | 0672758 | | 9/1995 | |
| EP | 2468909 | | 6/2012 | |
| JP | 06212353 | | 8/1994 | |
| JP | 06248332 | | 9/1994 | |
| JP | 06248339 | | 9/1994 | |
| JP | 10237585 | | 9/1998 | |
| JP | 10245655 | | 9/1998 | |
| JP | 11124654 | | 5/1999 | |
| JP | 2000054070 | | 2/2000 | |
| JP | 2004197199 | | 7/2004 | |
| JP | 2005320633 | A * | 11/2005 | ............. C22C 38/00 |
| JP | 2007092130 | A * | 4/2007 | |
| JP | 2010180423 | | 8/2010 | |
| JP | 2011042816 | | 3/2011 | |
| JP | 2011132575 | A * | 7/2011 | ............... C21D 9/46 |
| JP | 2012107315 | | 6/2012 | |

(Continued)

OTHER PUBLICATIONS

Korean Office Action with partial English translation for Application No. 20157013527, dated Jun. 16, 2016, 5 pages.
International Search Report for PCT/JP2013/006553 dated Feb. 4, 2014.
Canadian Office Action for Canadian Application No. 2885201, dated May 18, 2017, 3 Pages.
Chinese Office Action for Application No. 201380058233.0 with partial English language translation, dated Oct. 9, 2016, 17 pages.
Canadian Office Action for Canadian Application No. 2,885,201, dated Aug. 3, 2016, 3 pages.

(Continued)

*Primary Examiner* — Matthew E. Hoban
(74) *Attorney, Agent, or Firm* — RatnerPrestia

(57) ABSTRACT

Provided are a steel sheet for a can having high buckling strength for a can body against an external force and excellent formability when being formed into a shape having a design effect by additionally giving elongation strain in the circumferential direction after the steel sheet having been formed into a cylindrical shape and a method for manufacturing the steel sheet. The chemical composition is controlled to contain, by mass %, C: 0.0005% or more and 0.0035% or less, Si: 0.050% or less, Mn: more than 0.60% and 1.00% or less, P: 0.030% or less, S: 0.020% or less, Al: 0.010% or more and 0.100% or less, N: 0.0030% or less, B: 0.0005% or more, and the balance being Fe and inevitable impurities, in which the relationship B/N≥0.50 is satisfied where B/N represents (B(mass %)/10.81)/(N(mass %)/14.01), and a Young's modulus in a direction at an angle of 90° to the rolling direction is 220 GPa or more.

5 Claims, No Drawings

(56) References Cited

FOREIGN PATENT DOCUMENTS

| | | |
|---|---|---|
| JP | 2012233255 | 11/2012 |
| WO | 03031670 | 4/2003 |
| WO | 2011021646 | 2/2011 |
| WO | 2012144213 | 10/2012 |

OTHER PUBLICATIONS

Supplementary European Search Report for Application No. EP 13 85 3328 dated Dec. 4, 2015.
Chinese Office Action dated Feb. 16, 2016 for Chinese Application No. 201380058233.0, including Concise Statement of Relevance, 17 pages.
Korean Office Action dated Jun. 16, 2016 for Korean Application No. 2015-7013527, including Concise Statement of Relevance, 6 pages.
U.S. Final Office Action for U.S. Appl. No. 14/112,717, dated Aug. 1, 2016, 11 pages.
Canadian Office Action for Canadian Application No. 2,885,201, dated Mar. 2, 2018, 3 pages.

* cited by examiner

STEEL SHEET FOR THREE-PIECE CAN AND METHOD FOR MANUFACTURING THE SAME

CROSS REFERENCE TO RELATED APPLICATIONS

This is the U.S. National Phase application of PCT/JP2013/006553 filed Nov. 6, 2013, which claims priority to Japanese Patent Application No. 2012-245458, filed Nov. 7, 2012, the disclosures of these applications being incorporated herein by reference in their entireties for all purposes.

TECHNICAL FIELD OF THE INVENTION

Aspects of the present invention relate to a steel sheet which can be suitably used as a material for three-piece cans which are used as food cans and beverage cans. A steel sheet for a three-piece can according to aspects of the present invention is excellent in terms of formability when being formed into an unusual-shape having a design effect by additionally giving elongation strain in the circumferential direction after having been formed into a cylindrical shape and welded. In addition, a can which is manufactured using a steel sheet for three-piece cans according to aspects of the present invention has a high buckling strength of a can body against an external force.

BACKGROUND OF THE INVENTION

Since it is desirable that the amount of steel sheets used for food cans and beverage cans is decreased in view of decreasing environmental load and cost, the thickness of steel sheets has been reduced. However, with the reduction in thickness of steel sheets, following problems have been exposed. That is, can bodies become deformed by external forces which are applied when cans are handled in can making, in content filling, in transportation, and in the market. Further, can bodies become deformed (buckled) by external forces which are applied to the cans due to the increase and decrease of pressure inside and outside the can when, for example, a heat sterilization treatment is performed on the contents of the can.

As a countermeasure for these problems, steel sheets have been strengthened in order to increase the strength of can bodies. However, the increase in the strength of a steel sheet decreases the shape fixability when roll forming is performed in order to form a can into a cylindrical shape before a seam welding is performed, and an appropriate width is not achieved for an overlapping portion of the steel sheet when welding is performed. Accordingly, in the case of a three-piece can where the can body is welded by performing seam welding, troubles occur in the welding process.

In addition, an increase in the strength of a steel sheet is accompanied by a decrease in ductility at the same time, and decreases formability for, for example, neck forming and flange forming which are performed on a can body after the welding.

In addition, in many cases of three-piece cans which are used as beverage containers such as coffee cans, cans are formed by roll forming in a direction at an angle of 90° to the rolling direction of a steel sheet, that is, in the width direction of a steel sheet. Regarding the mechanical properties in the width direction of a steel sheet, in general, since the strength is higher than that in the rolling direction and ductility is lower than that in the rolling direction, it is difficult to apply a strengthened steel sheet to such kinds of cans.

As described above, the strengthening of a steel sheet is not necessarily an optimum method for compensating for a decrease in deformation resistance due to the reduction in thickness of a steel sheet.

In the first place, the buckling of a can body occurs due to a decrease in the rigidity of a can caused by reduction in thickness of the can body. Therefore, it is considered that, for increasing buckling resistance, it is effective to increase Young's modulus (longitudinal elasticity modulus) of a steel sheet and thereby improve the rigidity of the can body. There is a strong correlation between Young's modulus and a crystal orientation. It is known that, in the case where there is a large amount of crystal orientation group (α fiber) having the <110> orientation parallel to the rolling direction, there is an increase in Young's modulus in a direction at an angle of 90° to the rolling direction. As examples of steel sheets for cans which have been developed in order to increase Young's modulus, the following techniques are disclosed.

Patent Literature 1 discloses a technique for manufacturing a steel sheet for a container having an increased Young's modulus in a direction at an angle of 90° to the rolling direction, in which a strong α fiber is formed by performing second cold rolling with a rolling reduction of more than 50% after performing annealing of a cold-rolled steel sheet.

Patent Literature 2 discloses a technique for manufacturing a steel sheet for a container having an increased Young's modulus in a direction at an angle of 90° to the rolling direction, in which a strong α fiber is formed by performing cold rolling with a rolling reduction of 60% or more on a hot-rolled steel sheet and performing no annealing.

Patent Literature 3 discloses a technique for manufacturing a steel sheet for a container having an increased Young's modulus in a direction at an angle of 90° to the rolling direction. Ti, Nb, Zr, and B are added to ultralow-carbon steel. Hot rolling is performed with a rolling reduction of at least 50% or more at a temperature equal to or lower than the $Ar_3$ transformation point, and annealing is performed at a temperature of 400° C. or higher and equal to or lower than the recrystallization temperature after the cold rolling.

Nowadays, on the other hand, there is a case where a steel sheet is formed into a characteristic shape in order to give a design effect to a can by additionally giving elongation strain in the circumferential direction to the can after the steel sheet has been formed into a cylindrical shape and welded. A can which is formed in such a manner is called an unusual-shaped can. Since there is an increase in the rigidity of a can body due to the effect of the shape of such an unusual-shaped can, the strength of the can body increases. In particular, this strengthening is effective with respect to buckling caused by the increase and decrease of pressure inside and outside the can when, for example, a heat sterilization treatment is performed on the contents of the can. A steel sheet which is used for such an unusual-shaped can is required to have sufficient ductility for preventing fracturing from occurring when being formed. In addition, it is necessary that the yield point elongation of a steel sheet which is used for an unusual-shaped can should be controlled to be low in order to prevent stretcher strain from occurring. In addition, it is necessary to prevent an increase in the grain size of a steel sheet which is used for an unusual-shaped can in order to prevent surface deterioration from occurring. Moreover, it is necessary that the Lankford value (r value) of a steel sheet which is used for an unusual-shaped can is low in order to prevent the height of the can from decreasing.

In particular, in many cases of three-piece cans which are used as beverage containers such as coffee cans, welding is performed so that a direction at an angle of 90° to the rolling direction of a steel sheet, that is, the width direction of the steel sheet, is the circumferential direction of the can body. In this case, tensile deformation occurs in the circumferential direction of the can body when the can body is formed into the can body of an unusual-shaped can. Due to the tensile elongation in the circumferential direction, compressive deformation contrarily occurs in the height direction of the can. As a result, the can height decreases. It is effective to decrease an r value in the circumferential direction for suppressing such a decrease in the can height. As examples of techniques related to steel sheets having such a property, the following techniques are disclosed.

Patent Literature 4 discloses a manufacturing method including heating a steel material containing, by mass %, C: more than 0.05% and 0.1% or less, Mn: 0.3% to 1.5%, Al: 0.01% to 0.1%, B: 0.0002% to 0.01%, and N: 0.0030% or less at a heating temperature of 1050° C. to 1300° C. Finish rolling is performed on the heated steel material with a finish rolling temperature of 800° C. to 1000° C., coiling the hot-rolled steel sheet at a coiling temperature of 500° C. to 750° C., thereafter performing pickling and subsequent cold rolling. Continuous annealing is performed on the cold-rolled steel sheet at a temperature equal to or higher than the recrystallization temperature and 720° C. or lower, and second cold rolling is performed on the annealed steel sheet with a rolling reduction of more than 8% to 10%. This is a technique in which an r value is decreased and aging character is improved by appropriately controlling the contents of Mn and B in particular among the constituents of steel.

Patent Literature 5 discloses a technique, in which at least one of the r values in the rolling direction and a direction at a right angle to the rolling direction is 1.0 or less. Hot rolling is performed on a steel slab containing C: 0.0005 to 0.05 wt % and B: 0.0002 to 0.01 wt % with a finish rolling temperature of 800° C. to 1000° C. and the hot-rolled steel sheet is coiled at a coiling temperature of 500° C. to 750° C. First cold rolling is performed, annealed by soaking in a temperature range from the recrystallization temperature to 850° C. for a soaking time of 60 seconds or less, and subsequently second cold rolling is performed with a rolling reduction of 20% or less. This is a technique in which a decrease in can height due to forming is suppressed by determining an r value.

PATENT LITERATURE

PTL 1: Japanese Unexamined Patent Application Publication No. 6-212353
PTL 2: Japanese Unexamined Patent Application Publication No. 6-248332
PTL 3: Japanese Unexamined Patent Application Publication No. 6-248339
PTL 4: Japanese Unexamined Patent Application Publication No. 11-124654
PTL 5: Japanese Unexamined Patent Application Publication No. 10-245655

SUMMARY OF THE INVENTION

However, there are the following problems in the cases of the conventional techniques described above.

In the case of the technique according to Patent Literature 1, it is necessary to form a worked microstructure in which the ratio of a major axis size to a minor axis size of a crystal grain is 4 or more on average in order to achieve high Young's modulus. In order to form such a worked microstructure, more than 50% rolling reduction of the second cold rolling in a method for manufacturing a steel sheet in which second cold rolling is required. As a result, the strength of the steel sheet excessively increases. In addition, there is an increase in manufacturing cost due to an addition of the second cold rolling process.

In the case of the technique according to Patent Literature 2, since cold rolling is performed with a rolling reduction of 60% or more in order to achieve high Young's modulus, and since no annealing is performed thereafter, there is not only an excessive increase in the strength of the steel sheet but also a decrease in elongation. Accordingly, troubles occur when neck forming and flange forming are performed on the steel sheet.

In the case of the technique according to Patent Literature 3, it is necessary to perform annealing at a temperature equal to or lower than a recrystallization temperature in order to obtain a steel sheet having high Young's modulus. As a result, since a microstructure which has been formed by performing cold rolling remains in the microstructure of the steel sheet, there is not only an excessive increase in the strength of the steel sheet but also a decrease in elongation. Accordingly, troubles occur when neck forming and flange forming are performed on the steel sheet.

In the case of the technique according to Patent Literature 4, it is necessary to perform second cold rolling with a rolling reduction of more than 8% in order to decrease an r value which tends to increase due to addition of B. As a result, there is not only an increase in the strength of the steel sheet but also a decrease in the ductility of the steel sheet. Due to this decrease in ductility, there are concerns that (i) fracturing may occur due to forming of a can body with a high degree of working, (ii) neck formability may decrease, and (iii) flange formability may decrease. As a result, there is a limit to thickness reduction.

In the case of the technique according to Patent Literature 5, since a steel sheet of ultralow-carbon steel having a low strength is used, the buckling resistance of the steel sheet decreases. It is known that, in order to suppress the decrease in buckling resistance, it is necessary to increase the strength of a steel sheet by performing second cold rolling. As a result of increasing strength in such a manner, the elongation of the steel sheet decreases. Therefore, it is concerned that (i) fracturing of the steel sheet may occur due to forming of a can body with a high degree of working, (ii) neck formability may decrease, and (iii) flange formability may decrease. Accordingly, the thickness reduction is limited.

That is to say, in the case where high-strength material is used in order to prevent a decrease in the buckling resistance of a can due to reduction in the thickness of a steel sheet, there is a decrease in neck formability and flange formability. Accordingly, also in the case where the rigidity of a can is increased by forming an unusual-shaped can with a design effect to the can, there is a limit to thickness reduction in order to achieve sufficient buckling resistance for the can while maintaining sufficient formability for a can body.

The present invention has been completed in view of the situation described above. Aspects of the present invention aim to, by solving the problems with the conventional techniques described above, to provide a steel sheet for a can having (i) high buckling strength for a can body against an external force and (ii) excellent formability when being formed into an unusual-shape having a design effect by additionally giving elongation strain in the circumferential direction after having been formed into a cylindrical shape. An additional object of the present invention is to provide a method for manufacturing such steel sheet.

The present inventors diligently conducted investigations in order to solve the problems described above, and as a result, found that it is possible to manufacture a steel sheet for a three-piece can having excellent buckling strength for a can body against an external force by optimizing, for example, a chemical composition using ultralow-carbon steel as a base. The inventors completed the present invention on the basis of the subject matter of the present invention, which includes the following aspects.

(1) A steel sheet for a three-piece can, the steel sheet having a chemical composition containing, by mass %, C: 0.0005% or more and 0.0035% or less, Si: 0.050% or less, Mn: more than 0.60% and 1.00% or less, P: 0.030% or less, S: 0.020% or less, Al: 0.010% or more and 0.100% or less, N: 0.0030% or less, B: 0.0005% or more, and the balance being Fe and inevitable impurities, in which the relationship B/N≥0.50 is satisfied where B/N represents (B(mass %)/10.81)/(N(mass %)/14.01), and a Young's modulus in a direction at an angle of 90° to the rolling direction is 220 GPa or more.

(2) The steel sheet for a three-piece can according to item (1), in which a Lankford value in a direction at an angle of 90° to the rolling direction is less than 1.00, a yield point elongation is 3.0% or less after a heat treatment at a temperature of 210° C. for a duration of 20 minutes, and a breaking elongation is 25% or more after a heat treatment at a temperature of 210° C. for a duration of 20 minutes.

(3) The steel sheet for a three-piece can according to item (1) or (2), in which the steel sheet has a microstructure in which an average integrated intensity of (111)[1-10] to (111)[-1-12] orientations in a plane parallel to a surface of the steel sheet is less than 7.0 and in which an average integrated intensity of (001)[1-10] to (111)[1-10] orientations in a plane parallel to the surface of the steel sheet is 3.8 or more.

(4) A method for manufacturing a steel sheet for a three-piece can according to any one of items (1) to (3), the method including hot rolling a steel slab under conditions that the reheating temperature is higher than 1100° C. and 1300° C. or lower and that the final finish rolling temperature is 850° C. or higher and lower than 950° C., the steel slab having a chemical composition containing, by mass %, C: 0.0005% or more and 0.0035% or less, Si: 0.050% or less, Mn: more than 0.60% and 1.00% or less, P: 0.030% or less, S: 0.020% or less, Al: 0.010% or more and 0.100% or less, N: 0.0030% or less, B: 0.0005% or more, and the balance being Fe and inevitable impurities, in which the relationship B/N≥0.50 is satisfied where B/N represents (B(mass %)/10.81)/(N(mass %)/14.01), coiling the hot-rolled steel sheet at a temperature of 500° C. or higher and lower than 650° C., pickling and thereafter cold rolling the coiled steel sheet with a rolling reduction of more than 92%, recrystallization annealing at a temperature of higher than 700° C. and 800° C. or lower using a continuous annealing process, and skin pass rolling the recrystallization annealed steel sheet with an elongation ratio of 0.5% or more and 5.0% or less.

Aspects of the present invention focus on improving the buckling resistance of a can body. A method for the improvement is not one which has been widely used in the past and in which the strength of a steel sheet is increased but one in which the Young's modulus of a steel sheet is increased.

Since a method in which strength is increased as is the case with conventional techniques is not used, the steel sheet according to embodiments of the present invention has sufficient buckling resistance and excellent formability at the same time.

When the steel sheet according to embodiments of the present invention is applied to an unusual-shaped can, the effect of the Young's modulus described above and the effect of the shape of the unusual-shaped can function synergistically, which contributes to an increase in the rigidity of the can and further increases buckling resistance.

That is to say, according to aspects of the present invention, it is possible to provide a steel sheet for a can having (i) high buckling strength for a can body against an external force and (ii) excellent formability when being formed into an unusual-shape having a design effect by additionally giving elongation strain in the circumferential direction after having been formed into a cylindrical shape. It is also possible to provide a method for manufacturing such steel sheet.

DETAILED DESCRIPTION OF EMBODIMENTS OF THE INVENTION

The present invention will be described in detail hereafter with reference to exemplary embodiments. Here, the present invention is not limited to the embodiments described below.

First, the chemical composition of the steel will be described. Here, "%" used when describing the contents of the constituents represents mass %.

C: 0.0005% or More and 0.0035% or Less

C is a chemical element which has an influence on a recrystallized texture. The integration of a crystal orientation group having the {111} plane parallel to the surface of a steel sheet increases with a decrease of C content. By increasing the integration of this crystal orientation group, there is a tendency for Young's modulus to increase regardless of an angle with respect to the rolling direction of a steel sheet. As a result, increasing the integration of the crystal orientation group having the {111} plane parallel to the surface of a steel sheet contributes to increase Young's modulus in a direction at an angle of 90° to the rolling direction, which is preferably in aspects of the present invention. Desirably, as a condition for realizing this effect, the C content is set to be 0.0035% or less. In addition, yield point elongation increases with an increase of an amount of solid solute C in steel, and stretcher strain tends to occur. From this viewpoint, the upper limit of the C content is set to be 0.0035%. On the other hand, in the case where the C content is excessively small, there is an excessive increase in the crystal orientation group having the {111} plane parallel to the surface of a steel sheet. As a result of this increase, there is a relative decrease in the amount of a crystal orientation group (α fiber) having the <110> orientation parallel to the rolling direction which is effective for increasing Young's modulus in a direction at an angle of 90° to the rolling direction. Therefore, the C content is set to be 0.0005% or more. It is preferable that the C content is 0.0008% or more and 0.0030% or less, or most preferably 0.0010% or more and 0.0027% or less. Here, the definition and notation of a crystal orientation are based on a literature (Toyohiko Konno: "Symmetry in Material and Group Theory", Kyoritsu Shuppan Co., Ltd., October, 2001).

Si: 0.050% or Less

In the case where the Si content is large, there is a problem in that the surface treatment performance of a steel sheet decreases and that the corrosion resistance of a steel sheet decreases. Therefore, the Si content is set to be 0.050% or less, preferably 0.020% or less, or most preferably 0.015% or less. Here, although no particular limitation is set on the lower limit of the Si content and the Si content may be 0%, it is preferable that the Si content is 0.005% or more, because there is an excessive increase in refining cost in the case where the Si content is excessively small.

Mn: More than 0.60% and 1.00% or Less

Mn is a chemical element which is beneficial for realizing the effect of the present invention. In the case where Mn is contained in steel, since Mn combines with S to form MnS, it is possible to prevent a decrease in hot ductility caused by S. Therefore, it is beneficial to add a certain amount or more of Mn. On the other hand, it is necessary to avoid addition of a large amount of Mn which causes excessive hardening and a decrease in corrosion resistance.

In addition, aspects of the present invention aim to achieve (i) an increase in the Young's modulus of a steel sheet in order to increase the buckling resistance of a can body, (ii) a decrease in r value in the width direction of a steel sheet which is desirable when the steel sheet is used for an unusual-shaped can, (iii) a decrease in aging, and (iv) a decrease in grain size in order to prevent surface deterioration. It is possible to achieve these targets by adding Mn in an appropriate amount.

First, it is necessary to achieve a sufficient amount of α fiber in order to increase Young's modulus. In embodiments of the present invention, the average value of Young's modulus is increased in all directions in the surface of the steel sheet as a result of increased integration of the crystal orientation group having the {111} plane parallel to the surface of the steel sheet by controlling the C content to 0.0005% or more and 0.0035% or less. However, in the case where the integration is excessively high, there is a relative decrease in the amount of α fiber which is effective for increasing Young's modulus in a direction at an angle of 90° to the rolling direction, which is an aim of aspects of the present invention. Since Mn is effective for suppressing the integration of the crystal orientation group having the {111} plane parallel to the surface of the steel sheet in the case where the C content is within the range described above, the relative decrease in the amount of α fiber is prevented. In addition, in the case where the steel sheet is used for manufacturing an unusual-shaped can, it is desirable to decrease r value in the circumferential direction of a can body. Since r value is also dependent on the integration of the crystal orientation group, it is possible to decrease r value, in particular, r value in the width direction of the steel sheet through the use of the effect of Mn described above. Moreover, Mn also contributes to decrease aging. Since the C content of the steel sheet according to aspects of the present invention is within a range of the C content for so-called ultralow-carbon steel, most of C in the steel sheet presents in the form of solid solution with a small amount of C is in the form of cementite. Aging is caused by the presence of solid solute C, and aging character is deteriorated when the amount of solid solute C is large. Mn reacts with C and stabilizes C in the form of solid solute C. Mn further stabilizes cementite by replacing Fe to be mixed into cementite and prevents an increase in the amount of solid solute C by suppressing dissolution of cementite when heating is performed. In addition, since Mn is one of the chemical elements that lower the $Ar_a$ transformation point, Mn is effective for decreasing a crystal grain size during hot rolling. In addition, Mn contributes to suppress surface deterioration during forming of the steel sheet by decreasing a crystal grain size after cold rolling and annealing in combination with the effect of decreasing grain size caused by adding B as described below.

In order to realize the effects described above, it is beneficial that the Mn content is more than 0.60%. On the other hand, in the case where the Mn content is excessively large, the effects described above become saturated, the corrosion resistance decreases, and the hardness increases excessively. Therefore, the upper limit of the Mn content is set to be 1.00%. It is preferable that the Mn content is 0.63% or more and 0.91% or less.

P: 0.030% or Less

P causes an increase in the hardness of steel and a decrease in corrosion resistance of steel in the case where the P content is large. Therefore, the upper limit of the P content is set to be 0.030%. It is preferable that the P content is 0.022% or less. Here, although no particular limitation is set on the lower limit of the P content, it is preferable that the lower limit of the P content is 0.002%, because there is an excessive increase in refining cost in the case where the P content is excessively small.

S: 0.020% or Less

S forms MnS by combining with Mn in the steel and decreases the hot ductility when a large amount of MnS is precipitated. Therefore, the upper limit of the S content is set to be 0.020%. It is preferable that the S content is 0.018% or less. Here, although no particular limitation is set on the lower limit of the S content, it is preferable that the lower limit of the S content is 0.002%, because there is an excessive increase in refining cost in the case where the S content is excessively small.

Al: 0.010% or More and 0.100% or Less

Al is a chemical element which is added as a deoxidizing agent. In addition, Al is, as a result of reacting with N to form AlN, effective for decreasing yield point elongation by decreasing the amount of solid solute N in steel and for increasing Young's modulus through the growth of a texture facilitated by decreasing the grain size of the microstructure of a hot-rolled steel sheet. However, a sufficient deoxidizing effect and a sufficient effect of decreasing the amount of solid solute N are not realized in the case where the Al content is less than 0.010%. On the other hand, it is not preferable that the Al content is more than 0.100%, because the effects described above become saturated and there is an increase in the amount of inclusions such as alumina. Therefore, the Al content is set to be 0.010% or more and 0.100% or less. It is preferable that the Al content is 0.025% or more and 0.050% or less.

N: 0.0030% or Less

N is one of the impurities which are inevitably included in the steel. Since yield point elongation increases with increasing N content, stretcher strain tends to occur. In addition, since the amount of B necessary for fixing N increases with increasing N content, there is an increase in manufacturing cost of steel sheets. Therefore, the upper limit of the N content is set to be 0.0030%. It is preferable that the upper limit of the N content is 0.0025%. On the other hand, N contributes to increasing Young's modulus through the growth of a texture facilitated by decreasing the grain size of the microstructure of a hot-rolled steel sheet as a result of reacting with Al to form AlN. From this viewpoint, it is preferable that the N content is 0.0005% or more, or more preferably 0.0018% or more.

B: 0.0005% or more and B/N≥0.50 is satisfied (where B/N represents (B(mass %)/10.81)/(N(mass %)/14.01))

B is also a chemical element which is useful for realizing the effects of the present invention. B is precipitated in the form of BN (boron nitride) in the hot rolling stage. It is known that, in the case where B is added in an amount more than necessary for precipitating BN, B is effective for decreasing the grain size of a hot-rolled steel sheet and of an annealed steel sheet. In particular, in the case where B is added excessively compared with N, this effect is increased. This is because excessively added B is segregated in the form of solid solute B at the grain boundaries and therefore the growth of crystal grains is suppressed. It is desirable that B presents in the form of solid solute B even after BN has been segregated. Specifically, it is preferable that the atomic ratios of B and N satisfy B/N≥0.50. In addition, B is effective for preventing age hardening by combining with solid solute N in steel and precipitating in the form of BN. In the case where the B content is less than 0.0005% or where B/N is less than 0.50, it is difficult to realize this effect. Therefore, in embodiments of the present invention, a chemical composition is controlled so that the B content is 0.0005% or more and the relationship B/N≥0.50 is satisfied. It is preferable that the B content is 0.0008% or more and satisfies the relationship B/N≥0.58. Here, although no particular limitation is set on the upper limit of the B content, it is preferable that the upper limit of the B content is 0.0100%, because the effect becomes saturated and there is an increase in cost in the case where the B content is excessively large.

Fe and Inevitable Impurities

The remainder of the chemical composition other than the constituents described above consists of Fe and inevitable impurities. Here, examples of inevitable impurities include Sn. Sn is one of the typical inevitable impurities which are inevitably contained in the steel. There is no particular limitation on the contents of inevitable impurities, and acceptable contents of inevitable impurities depend on the kinds of inevitable impurities. In the case of Sn, there is no problem if the Sn content is 0.10% or less.

Subsequently, the material properties and microstructure according to embodiments of the present invention will be described.

Young's modulus in a direction at an angle of 90° to the rolling direction is 220 GPa or more The Young's modulus in a direction at an angle of 90° to the rolling direction is set to be 220 GPa or more in order to increase the rigidity of a can body. With this, the paneling strength significantly increases and it becomes possible to prevent, even when the thickness of the steel sheet is reduced, deformation of the can body due to the increase and decrease of pressure inside and outside the can during, for example, a heat sterilization treatment on the contents of the can. The Young's modulus described above is preferably 221 GPa or more. Here, specific conditions for determining the Young's modulus described above will be described in EXAMPLES.

Lankford value in a direction at an angle of 90° to the rolling direction is less than 1.00

When the can body is formed into the can body of an unusual-shaped can, since circumferential tensile deformation is applied to the can body, compressive deformation occurs in the height direction of the can. It is effective to control the Lankford value in the circumferential direction of the can body to be less than 1.00 for suppressing the compressive deformation. Therefore, it is preferable that the Lankford value in a direction at an angle of 90° to the rolling direction is less than 1.00, or more preferably 0.96 or less. Here, specific conditions for determining the Lankford value will be described in EXAMPLES.

Yield point elongation of 3.0% or less after a heat treatment at a temperature of 210° C. for a duration of 20 minutes In many cases of food cans and beverage cans, since a steel sheet is formed into a can body after the steel sheet has been subjected to baking painting, it is beneficial to evaluate the steel sheet after performing a heat treatment equivalent to the baking painting. In addition, in many cases of three-piece cans, the circumferential direction of a can body is the width direction of the steel sheet. Accordingly, it is possible to evaluate the formability in a can body forming process in which tensile strain is applied in the circumferential direction by conducting a tensile test using a tensile test piece which is prepared so that the longitudinal direction of the test piece is a direction at an angle of 90° to the rolling direction. Therefore, the tensile test is conducted using a test piece which is prepared so that the longitudinal direction thereof is a direction at an angle of 90° to the rolling direction after a heat treatment at a temperature of 210° C. for a duration of 20 minutes. In the case where the yield elongation obtained using this test method is more than 3.0%, since stretcher strain occurs when the steel sheet is formed into an unusual-shaped can, there is a decrease in visual effect. Therefore, it is preferable that the yield point elongation is 3.0% or less, or more preferably 2.6% or less, after a heat treatment at a temperature of 210° C. for a duration of 20 minutes. Specific conditions for determining the yield point elongation described above will be described in EXAMPLES.

Breaking elongation of 25% or more after a heat treatment at a temperature of 210° C. for a duration of 20 minutes In the case where the breaking elongation obtained in the tensile test described above using a test piece which is prepared so that the longitudinal direction thereof is a direction at an angle of 90° to the rolling direction is less than 25% after a heat treatment at a temperature of 210° C. for a duration of 20 minutes, the steel sheet fractures when the steel sheet is subjected to can body forming with a high degree of working. Therefore, it is preferable that the breaking elongation is 25% or more, or more preferably 27% or more, after the heat treatment described above. Here, specific conditions for determining the breaking elongation described above will be described in EXAMPLES.

Average integrated intensity of (111)[1-10] to (111)[-1-12] orientations in a plane parallel to the surface of a steel sheet is less than 7.0

It is possible to isotropically increase Young's modulus in directions at angles of 0°, 45°, and 90° to the rolling direction by growing textures of (111)[1-10] to (111)[-1-12] orientations. Therefore, it is preferable that the average integrated intensity of these orientations is high, and it is preferable that the average integrated intensity is 4.0 or more. However, in the case where the value of the crystallographic orientation distribution function of these orientations, that is, the integration of these orientations is high, there is a relative decrease in the integration of (001)[1-10] to (111)[1-10] orientations. As a result, there is a decrease in Young's modulus in the width direction of a steel sheet, which results in an increase in r value on the other hand. Therefore, it is preferable that the average integrated intensity of (111)[1-10] to (111)[-1-12] orientations is less than 7.0, or more preferably 6.8 or less. Here, regarding the notation of Miller indices, [1-10] and [-1-12] respectively correspond to Miller indices as expressed in relational expressions (I) and (II) below. In addition, specific methods for determining the integrated intensity described above will be described in EXAMPLES. Here, the definition and notation of a crystal orientation are based on the literature described above (Toyohiko Konno: "Symmetry in Material and Group Theory", Kyoritsu Shuppan Co., Ltd., October, 2001).

$$[1\text{-}10]=[1\bar{1}0] \tag{I}$$

$$[\text{-}1\text{-}12]=[\bar{1}\bar{1}2] \tag{II}$$

Average integrated intensity of (001)[1-10] to (111)[1-10] orientations in a plane parallel to the surface of a steel sheet is 3.8 or more In the case where the average integrated intensity of the texture of (001)[1-10] to (111)[1-10] orientations is increased, Young's modulus in the width direction of the steel sheet increases and r value in the width direction of the steel sheet decreases. In order to achieve the Young's modulus and the r value specified in embodiments of the present invention, it is preferable that the average integrated intensity of (001)[1-10] to (111)[1-10] orientations in a plane parallel to the surface of a steel sheet is 3.8 or more, or more preferably 4.1 or more. Here, specific methods for determining the integrated intensity described above will be described in EXAMPLES. The notation of Miller indices is used in the same manner as [1-10] and [-1-12].

Average Ferrite Grain Size

In the case where a steel sheet having a large average ferrite grain size is used for manufacturing an unusual-shaped can, so-called surface deterioration occurs due to micro irregularity which is formed on the surface of a steel sheet after being formed. In order to avoid this phenomenon, it is preferable that the average ferrite grain size is 10.0 μm or less, or more preferably 7.9 μm or less. Here, specific conditions for determining the average ferrite grain size described above will be described in EXAMPLES.

Subsequently, the manufacturing conditions according to aspects of the present invention will be described.

Slab heating temperature: higher than 1100° C. and 1300° C. or lower

In the case where the slab heating temperature is excessively high, there is a problem in that defects occur on the surface of a product and that there is an increase in energy cost, or the like. On the other hand, in the case where the slab heating temperature is excessively low, since the re-dissolution of precipitates such as AlN and BN does not sufficiently progress, a variation in the distribution of these precipitates occurs, which results in a variation in the distribution of the crystal grain size of a steel sheet. As a result, the specified Young's modulus and r value are not achieved. Therefore, the slab heating temperature is set to be higher than 1100° C. and 1300° C. or lower.

Final finish rolling temperature of hot rolling: 850° C. or higher and lower than 950° C.

The final finish rolling temperature is set to be 850° C. or higher and lower than 950° C. from the viewpoint of a decrease in the crystal grain size and uniformity of the distribution of precipitates of a hot-rolled steel sheet. In the case where the final finish rolling temperature is 950° C. or higher, γ grains (austenite grains) markedly grow after rolling, and there is an excessive increase in the size of α grains (ferrite grains) after transformation has occurred due to an increase in the size of the γ grains. In addition, in the case where the final finish rolling temperature is lower than 850° C., since rolling is performed at a temperature equal to or lower than the $Ar_3$ transformation point, there is an excessive increase in the size of the α grains.

Coiling temperature of hot rolling: 500° C. or higher and lower than 650° C.

In the case where the coiling temperature is excessively low, the shape of a hot-rolled steel sheet is deteriorated and the operations in the subsequent pickling and cold rolling processes are disturbed by the deterioration. Therefore, the coiling temperature is set to be 500° C. or higher, preferably 560° C. or higher. On the other hand, in the case where the coiling temperature is excessively high, the thickness of the scale of a steel sheet significantly increases and there may be a decrease in scale peeling performance in the subsequent pickling. In addition, it is difficult to achieve the desired Young's modulus and r value for products due to changes in a texture as a result of an increase in the crystal grain size of a hot-rolled steel sheet. Accordingly, the coiling temperature is set to be lower than 650° C. It is preferable that the coiling temperature is 620° C. or lower in order to achieve further improvement regarding the problems described above. It is more preferable that the coiling temperature is 590° C. or lower. This is because the crystal grain size after annealing is decreased as a result of decreasing the grain size of a hot-rolled steel sheet by suppressing the growth of α grains due to a decrease in the coiling temperature. Here, there is no particular limitation on what pickling conditions are used in the subsequent pickling process as long as surface scale is removed. Pickling may be performed using common methods.

Rolling Reduction of Cold Rolling: More than 92.0%

The rolling reduction is an efficacious manufacturing condition in embodiments of the present invention. The texture of a steel sheet after the annealing is influenced not only by the contents of Mn and B and the coiling temperature but also by the rolling reduction. Accordingly, it is desirable that the rolling reduction is appropriately controlled in accordance with the Mn content, the B content and the coiling temperature in the hot rolling process described above. Specifically, it is possible to control Young's modulus and an r value in the width direction within the specified ranges by controlling the rolling reduction to be more than 92.0%. Here, although there is no particular limitation on the upper limit of the rolling reduction, it is preferable that the upper limit of the rolling reduction is 96% in order to prevent troubles due to an increase in load on rolling mills.

Annealing Temperature: Higher than 700° C. and 800° C. or Lower

It is preferable that a continuous annealing method is used from the viewpoint of uniform material properties and high productivity. It is preferable that the annealing temperature in a continuous annealing process is equal to or higher than the recrystallization temperature, and further it is desirable that the annealing temperature is higher than 700° C. from the viewpoint of the uniformity of material properties. In the case where the annealing temperature is excessively high, there is an excessive increase in crystal grain size. As a result, there is an increase in the degree of surface deterioration and there is an increased risk of fracturing and buckling occurring in the furnace in the case of thin materials such as a steel sheet for a can. Therefore, the upper limit of the annealing temperature is set to be 800° C. It is preferable that the annealing temperature is 710° C. or higher and 780° C. or lower.

Elongation Ratio of Skin Pass Rolling: 0.5% or More and 5.0% or Less

It is preferable that the elongation ratio of skin pass rolling is 0.5% or more in order to provide surface roughness and in order to suppress occurrence of stretcher strain. On the other hand, in the case where the elongation ratio of skin pass rolling is more than 5.0%, there is a decrease in neck formability and flange formability due to an increase in the hardness and a decrease in the elongation of a steel sheet. Therefore, the upper limit of the elongation ratio of skin pass rolling is set to be 5.0%. It is preferable that the elongation ratio of skin pass rolling is 1.2% or more and 4.0% or less.

EXAMPLES OF THE INVENTION

The steels A to N containing constituents given in Table 1 and the balance being Fe and inevitable impurities were melted and made into steel slabs. Using the obtained slabs, steel sheets as raw materials for cans were manufactured under the manufacturing conditions given in Table 2. Using these steel sheets as raw materials for cans, investigations such as measurement were conducted as described below.

Using the steel sheet as a raw material for a can, an average integrated intensity of (111)[1-10] to (111)[-1-12] orientations in a plane parallel to the surface of the steel sheet located at ¼ of the thickness was determined using a method described hereafter. First, chemical polishing (etching using oxalic acid) was performed in order to remove the influence of machining strain, and then the average integrated intensity mentioned above was determined at the polished position located at ¼ of the thickness. For the measurement, an X-ray diffractometer was used and (110), (200), (211), and (222) pole figures were created by using a Schultz reflection method. Orientation distribution function (ODF) was derived from these pole figures, and an average integrated intensity of (111)[1-10] to (111)[-1-12] orientations was defined as an average value of integrated intensities for $\phi1=0°, 5°, 10°, 90°$ (the angles 0° to 90° at intervals of 5° were assigned to $\phi1$) at $\phi2=45°$ and $\Phi=55°$ in Euler space (Bunge notation). In the same way, an average integrated intensity of (001)[1-10] to (111)[1-10] orientations was defined as an average value of integrated intensities for $\Phi=0°, 5°, 10°, 55°$ (the angles 0° to 55° at intervals of 5° were assigned to $\Phi$) at $\phi2=45°$ and $\phi=0°$. Here, "integrated intensity" refers to a random intensity ratio.

The evaluation of Young's modulus was performed, by using a test piece of 10 mm×35 mm which was cut out from the steel sheet so that the longitudinal direction of the test piece was a direction at an angle of 90° to the rolling direction, and by using a resonant frequency measuring machine of a transverse oscillation type. Specifically, Young's modulus $E_{90}$ in a direction at an angle of 90° to the rolling direction was determined in accordance with the standard by American Society for Testing Materials (C1259).

A Lankford value was determined using a tensile test piece having a width of 12.5 mm, a parallel length of 35 mm and a gauge length of 20 mm in accordance with JIS Z 2254 "Metallic materials-Sheet and strip-Determination of plastic strain ratio". Using this method, a Lankford value (r value) $r_{90}$ when a tensile test was performed in a direction at an angle of 90° to the rolling direction was determined.

In addition, a heat treatment on a JIS No. 13 B tensile test piece whose longitudinal direction is at an angle of 90° to the rolling direction at a temperature of 210° C. for a duration of 20 minutes was performed. Thereafter, by performing a tensile test in accordance with JIS Z 2241 "Metallic materials-Tensile testing-Method", yield point elongation (YPEl) and breaking elongation (El) were determined.

Grain boundaries of a ferrite structure in a cross section in the rolling direction was exposed using etching with 3% nital solution. A photograph was taken using an optical microscope at a magnification of 400 times, and average ferrite grain size was determined using the taken photograph and a sectioning method in accordance with JIS G 0551 "Steel-Micrographic-determination of the apparent grain size".

The results obtained as described above are given in Table 2 along with the manufacturing conditions.

In addition, a Sn plating treatment was performed on these steel sheets as raw materials for cans under conditions that coating weight of Sn on both sides was 2.8 g/m², and tin-plated steel sheets were manufactured. A baking treatment equivalent to a painting process was performed on each of these tin-plated steel sheets at a temperature of 210° C. for a duration of 20 minutes and the baked steel sheet was cut into a rectangular shape. The cut piece was formed into a cylindrical shape so that the height direction of the cylinder was the rolling direction of the steel sheet and both edges were joined by performing seam welding. Flanges were formed at both open ends of the cylinder by extending the open ends outward, disk-shaped can lids which were separately prepared to the flanges were seamed using a double seaming method, and a can was prepared. The size of the can was decided depending on the thickness of steel sheets as raw materials for cans in the manner described below in accordance with the application record in the market. The diameter of the can body was 52 mm and the can height was 98 mm in the case of a thickness of 0.160 mm, the diameter of the can body was 52 mm and the can height was 120 mm in the case of a thickness of 0.170 mm, the diameter of the can body was 63 mm and the can height was 100 mm in the case of a thickness of 0.180 mm, and the diameter of the can body was 70 mm and the can height was 110 mm in the case of a thickness of 0.170 mm. The obtained can was set in a hermetically-closed pressure-resistant vessel, and the pressure inside the vessel was increased using pressurized air in order to make the can buckle under the air pressure. At the same time, by continuously measuring the pressure inside the vessel, and by detecting a change in pressure inside the vessel due to the buckling of the can, a pressure with which buckling occurred was determined. The derived pressure with which buckling occurred was compared with the prescribed pressure in accordance with the can size. A case where the pressure with which buckling occurred was higher than the prescribed pressure was judged as satisfactory, and a case where the pressure with which buckling occurred was lower than the prescribed pressure was judged as unsatisfactory. These results are given in Table 2 as the evaluation results of buckling strength, where a satisfactory case is represented by ◯ and an unsatisfactory case is represented by x.

TABLE 1

| Steel Code | C | Si | Mn | P | S | Al | N | B | B/N (atom ratio) | Note |
|---|---|---|---|---|---|---|---|---|---|---|
| | | | | (mass %) | | | | | | |
| A | 0.0020 | 0.010 | 0.35 | 0.009 | 0.009 | 0.048 | 0.0014 | 0.0017 | 1.57 | Comparative Example |
| B | 0.0018 | 0.011 | 0.33 | 0.011 | 0.018 | 0.042 | 0.0022 | 0.0008 | 0.47 | Comparative Example |
| C | 0.0400 | 0.015 | 0.20 | 0.010 | 0.011 | 0.065 | 0.0015 | 0.0005 | 0.43 | Comparative Example |
| D | 0.0016 | 0.011 | 0.72 | 0.009 | 0.011 | 0.050 | 0.0020 | 0.0033 | 2.14 | Example |
| E | 0.0027 | 0.012 | 0.65 | 0.012 | 0.012 | 0.034 | 0.0018 | 0.0008 | 0.58 | Example |

TABLE 1-continued

| Steel Code | C | Si | Mn | P | S | Al | N | B | B/N (atom ratio) | Note |
|---|---|---|---|---|---|---|---|---|---|---|
| | | | | (mass %) | | | | | | |
| F | 0.0020 | 0.013 | 0.85 | 0.010 | 0.009 | 0.038 | 0.0018 | 0.0029 | 2.09 | Example |
| G | 0.0010 | 0.010 | 0.91 | 0.022 | 0.018 | 0.025 | 0.0022 | 0.0025 | 1.47 | Example |
| H | 0.0024 | 0.015 | 0.63 | 0.018 | 0.013 | 0.041 | 0.0023 | 0.0020 | 1.13 | Example |
| I | <u>0.0120</u> | 0.015 | 0.75 | 0.012 | 0.010 | 0.035 | 0.0022 | 0.0034 | 2.00 | Comparative Example |
| J | <u>0.0300</u> | 0.011 | 0.65 | 0.016 | 0.010 | 0.033 | 0.0026 | 0.0009 | <u>0.45</u> | Comparative Example |
| K | 0.0025 | 0.012 | 0.68 | 0.010 | 0.012 | 0.036 | <u>0.0036</u> | 0.0012 | <u>0.43</u> | Comparative Example |
| L | 0.0025 | 0.012 | 0.68 | 0.010 | 0.012 | 0.036 | 0.0010 | <u>0.0004</u> | 0.52 | Comparative Example |
| M | 0.0016 | 0.011 | 0.96 | 0.027 | 0.011 | 0.050 | 0.0020 | 0.0033 | 2.14 | Example |
| N | 0.0016 | 0.011 | 0.72 | 0.009 | 0.011 | 0.017 | 0.0028 | 0.0033 | 1.53 | Example |

(Annotation)

An underlined portion indicates a value out of the range according to the present invention.

B/N(atom ratio) = (B(mass %)/10.81)/(N(mass %)/14.01)

TABLE 2

| Experiment No. | Steel Code | Manufacturing Condition | | | | | | |
|---|---|---|---|---|---|---|---|---|
| | | Slab Reheating Temperature (° C.) | Finish Rolling Temperature (° C.) | Coiling Temperature (° C.) | Cold Rolling Reduction (%) | Annealing Temperature (° C.) | Final Finishing Thickness (mm) | Elongation Ratio (%) |
| 1 | <u>A</u> | 1200 | 890 | 560 | 92.7 | 710 | 0.160 | 1.2 |
| 2 | <u>B</u> | 1200 | 890 | 560 | 92.7 | 710 | 0.160 | 1.2 |
| 3 | <u>C</u> | 1200 | 890 | 560 | 92.7 | 710 | 0.160 | 1.2 |
| 4 | D | 1200 | 890 | 620 | 92.7 | 710 | 0.160 | 1.2 |
| 5 | D | 1100 | 890 | 620 | 92.7 | 710 | 0.160 | 1.2 |
| 6 | E | 1200 | 890 | 560 | 92.7 | 710 | 0.170 | 1.5 |
| 7 | E | 1200 | 890 | 680 | 92.7 | 710 | 0.170 | 1.5 |
| 8 | F | 1200 | 890 | 620 | 92.7 | 710 | 0.170 | 1.5 |
| 9 | F | 1200 | 890 | 620 | 90.6 | 710 | 0.170 | 1.5 |
| 10 | G | 1200 | 890 | 560 | 93.2 | 780 | 0.180 | 2.0 |
| 11 | G | 1200 | 890 | 560 | 93.2 | 695 | 0.180 | 2.0 |
| 12 | H | 1200 | 890 | 620 | 92.7 | 710 | 0.225 | 4.0 |
| 13 | H | 1200 | 890 | 620 | 92.7 | 710 | 0.225 | 6.5 |
| 14 | <u>I</u> | 1200 | 890 | 560 | 92.7 | 710 | 0.160 | 1.2 |
| 15 | <u>J</u> | 1200 | 890 | 620 | 92.7 | 710 | 0.160 | 1.2 |
| 16 | <u>K</u> | 1200 | 890 | 620 | 92.7 | 700 | 0.160 | 1.2 |
| 17 | <u>L</u> | 1200 | 890 | 620 | 92.7 | 710 | 0.160 | 1.2 |
| 18 | M | 1200 | 890 | 620 | 92.7 | 710 | 0.160 | 1.2 |
| 19 | N | 1200 | 890 | 620 | 92.7 | 710 | 0.160 | 1.2 |

| Experiment No. | Material Property and Microstructure | | | | | | | Evaluation Result of Buckling Strength | Note |
|---|---|---|---|---|---|---|---|---|---|
| | $E_{90}$ (GPa) | $r_{90}$ | YPEI (%) | EI (%) | $f_1$ | $f_2$ | Grain size (μm) | | |
| 1 | <u>218</u> | 1.45 | 2.8 | 38 | 10.1 | 3.0 | 9.6 | X | Comparative Example |
| 2 | <u>218</u> | 1.90 | 1.9 | 42 | 9.2 | 3.1 | 12.6 | X | Comparative Example |
| 3 | <u>206</u> | 1.03 | 6.5 | 30 | 7.2 | 3.6 | 11.0 | X | Comparative Example |
| 4 | 226 | 0.88 | 2.6 | 32 | 6.1 | 4.6 | 6.8 | ○ | Example |
| 5 | <u>211</u> | 1.12 | 1.1 | 28 | 7.3 | 3.3 | 6.2 | X | Comparative Example |
| 6 | 223 | 0.92 | 2.0 | 36 | 6.2 | 4.2 | 7.4 | ○ | Example |
| 7 | <u>216</u> | 1.25 | 1.1 | 38 | 7.6 | 3.4 | 8.9 | X | Comparative Example |
| 8 | 221 | 0.90 | 1.6 | 34 | 6.1 | 4.2 | 7.1 | ○ | Example |
| 9 | <u>200</u> | 1.10 | 1.5 | 36 | 6.8 | 2.2 | 7.6 | X | Comparative Example |
| 10 | 226 | 0.96 | 0.3 | 38 | 6.8 | 4.1 | 7.9 | ○ | Example |
| 11 | <u>218</u> | 0.91 | 0.0 | 26 | 7.2 | 4.5 | 6.5 | X | Comparative Example |
| 12 | 224 | 0.89 | 1.5 | 27 | 6.3 | 4.3 | 7.0 | ○ | Example |
| 13 | <u>217</u> | 0.92 | 0.0 | 22 | 6.6 | 4.6 | 7.2 | X | Comparative Example |
| 14 | <u>209</u> | 0.98 | 8.2 | 30 | 8.2 | 3.7 | 8.4 | X | Comparative Example |
| 15 | <u>207</u> | 1.15 | 6.7 | 28 | 6.8 | 3.6 | 6.3 | X | Comparative Example |
| 16 | <u>218</u> | 0.95 | 2.2 | 35 | 7.1 | 4.1 | 9.0 | X | Comparative Example |
| 17 | <u>218</u> | 0.93 | 1.2 | 37 | 7.4 | 4.0 | 9.5 | X | Comparative Example |

TABLE 2-continued

| | | | | | | | | | |
|---|---|---|---|---|---|---|---|---|---|
| 18 | 224 | 0.90 | 2.3 | 24 | 6.5 | 4.4 | 6.3 | ○ | Example |
| 19 | 223 | 0.96 | 6.4 | 31 | 6.6 | 4.2 | 7.0 | ○ | Example |

(Annotation)
An underlined portion indicates a value out of the range according to the present invention.
$f_1$ is an average integrated intensity of (111)[1-10] to (111)[-1-12] orientations.
$f_2$ is an average integrated intensity of (001)[1-10] to (111)[1-10] orientations.
$E_{90}$ is a Young's modulus in a direction at an angle of 90 degrees to the rolling direction.
$r_{90}$ is a Lankford value in a direction at an angle of 90 degrees to the rolling direction.
YPEl is yield point elongation after a heat treatment at a temperature of 210° C. for duration of 20 minutes.
El is breaking elongation after a heat treatment at a temperature of 210° C. for duration of 20 minutes.

As Table 2 indicates, in the case of the examples in accordance with aspects of the present invention, since Young's modulus in a direction at an angle of 90° to the rolling direction was 220 GPa or more, it is possible to increase the buckling strength of a can body against an external force. In addition, in the case of the examples in accordance with aspects of the present invention, since an r value in a direction at an angle of 90° to the rolling direction was less than 1.0, the can height is less likely to decrease even when the steel sheet is formed into an unusual-shaped can. In addition, in the case of the example in accordance with aspects of the present invention, the average integrated intensity of (111)[1-10] to (111)[-1-12] orientations was less than 7.0 and the average integrated intensity of (001)[1-10] to (111)[1-10] orientations was 3.8 or more. It is clarified that a Young's modulus of 220 GPa or more and an r value of less than 1.0 were achieved because of such textures. Moreover, it is clarified that stretcher strain is less likely to occur because yield point elongation after the heat treatment was small, and that the steel sheets have excellent formability when the steel sheets are formed into an unusual-shaped can because breaking elongation was large. On the other hand, the comparative examples had a Young's modulus described above of less than 220 GPa. The comparative examples were also insufficient as compared to the examples in accordance with, aspects of the present invention in terms of an r value, an average integrated intensity of (111)[1-10] to (111)[-1-12] orientations, an average integrated intensity of (001)[1-10] to (111)[1-10] orientations, yield point elongation, or breaking elongation.

The invention claimed is:

1. A steel sheet for a three-piece can, the steel sheet having a chemical composition consisting of, by mass %, C: 0.0005% or more and 0.0035% or less, Si: 0.050% or less, Mn: 0.63% or more and 1.00% or less, P: 0.030% or less, S: 0.020% or less, Al: 0.010% or more and 0.100% or less, N: 0.0030% or less, B: 0.0005% or more, and the balance being Fe and inevitable impurities, wherein:
   the relationship B/N≥0.50 is satisfied (where B/N represents (B(mass %)/10.81)/(N(mass %)/14.01));
   a Young's modulus in a direction at an angle of 90° to a rolling direction is 220 GPa or more;
   a Lankford value in the direction at the angle of 90° to the rolling direction is less than 1.00; and
   an average ferrite grain size in the steel sheet is 10.0 μm or less.

2. The steel sheet for a three-piece can according to claim 1, wherein:
   a yield point elongation is 3.0% or less after a heat treatment at a temperature of 210° C. for a duration of 20 minutes; and
   a breaking elongation is 25% or more after a heat treatment at a temperature of 210° C. for a duration of 20 minutes.

3. The steel sheet for a three-piece can according to claim 1, wherein the steel sheet has a microstructure in which:
   an average integrated intensity of (111)[1-10] to (111)[-1-12] orientations in a plane parallel to a surface of the steel sheet is less than 7.0; and
   an average integrated intensity of (001)[1-10] to (111)[1-10] orientations in a plane parallel to the surface of the steel sheet is 3.8 or more.

4. The steel sheet for a three-piece can according to claim 2, wherein the steel sheet has a microstructure in which:
   an average integrated intensity of (111) [1-10] to (111) [-1-12] orientations in a plane parallel to a surface of the steel sheet is less than 7.0; and
   an average integrated intensity of (001) [1-10] to (111) [1-10] orientations in a plane parallel to the surface of the steel sheet is 3.8 or more.

5. A method for manufacturing the steel sheet of claim 1, the method comprising:
   performing hot rolling on a steel slab under a condition that the reheating temperature is higher than 1100° C. and 1300° C. or lower and that the final finish rolling temperature is 850° C. or higher and lower than 950° C., the steel slab having a chemical composition consisting of, by mass %, C: 0.0005% or more and 0.0035% or less, Si: 0.050% or less, Mn: 0.63% or more and 1.00% or less, P: 0.030% or less, S: 0.020% or less, Al: 0.010% or more and 0.100% or less, N: 0.0030% or less, B: 0.0005% or more, and the balance being Fe and inevitable impurities, in which a relationship B/N≥0.50 is satisfied where B/N represents (B(mass %)/10.81)/(N(mass %)/14.01);
   coiling the hot-rolled steel sheet at a temperature of 500° C. or higher and lower than 650° C.;
   pickling and thereafter cold rolling the coiled steel sheet with a rolling reduction of more than 92.0%;
   recrystallization annealing at a temperature of higher than 700° C. and 800° C. or lower using a continuous annealing process; and
   skin pass rolling the recrystallization annealed steel sheet with an elongation ratio of 0.5% or more and 5.0% or less.

* * * * *